Sept. 10, 1968 B. LANG 3,401,257

CIRCUIT ARRANGEMENT FOR ISOLATING VOLTAGE MULTIPLIER D.C. SIGNAL CIRCUITS

Filed Aug. 6, 1965 3 Sheets-Sheet 1

INVENTOR
Bernhard Lang
BY Steel & Steel
ATTYS.

INVENTOR
Bernhard Lang
BY Spiess & Spiess
ATTYS.

Sept. 10, 1968 B. LANG 3,401,257

CIRCUIT ARRANGEMENT FOR ISOLATING VOLTAGE MULTIPLIER D.C. SIGNAL CIRCUITS

Filed Aug. 6, 1965

3 Sheets-Sheet 3

INVENTOR
Bernhard Lang

BY Spiee & Spiee

ATTYS.

United States Patent Office 3,401,257
Patented Sept. 10, 1968

3,401,257
CIRCUIT ARRANGEMENT FOR ISOLATING VOLTAGE MULTIPLIER D.C. SIGNAL CIRCUITS

Bernhard Lang, Karlsruhe, Germany, assignor to Siemens Aktiengesellschaft, Munich, Germany, a corporation of Germany Filed Aug. 6, 1965, Ser. No. 477,843
6 Claims. (Cl. 235—194)

ABSTRACT OF THE DISCLOSURE

For the separation of direct current signal circuits in voltage multipliers there are provided mangetic field-dependent semiconductor resistors which lie in a bridge circuit and whose resistance can be varied by means of the field of a coil whose one winding lies in a single circuit. A second feedback winding is energized by the output current of the bridge circuit. The bridge can be fed from an additional signal input circuit which has no connnection with the first input circuit and the output circuit.

The invention relates to a circuit arrangement for the conductive separation of signal circuits acting upon one another, particularly direct current signal circuits.

In electrical measuring technology the problem frequently arises of amplifying weak direct voltages or currents delivered from a measuring value transmitter and, in so doing, for example, of multiplying an input value present as variable direct current with a second input value adjustable for fixed values or also variable, as for example, a direct currrent signal. Frequently the problem is of particular importance in the conductive separation of various signal circuits from one another.

The utilization of ordinary D.C. amplifier circuits is not possible in this case, since all the circuits have to be connected with one another at least by one common ground conductor. If the input circuits are fed from different, locally separated current sources, there then exists the danger that interference voltages will be superimposed on the useful signal, which voltages have a D.C. component of appreciable amplitude, and which thus cannot be removed from the circuit in the same manner as inducted alternating interference voltages by means of suitable filter means.

The invention has as its problem, to make possible in a simple manner the transmission and amplification of D.C. voltage signals between two or more current circuits, without its being necessary that these circuits be conductively connected with one another.

For the solution of this problem it is proposed, according to the invention, that at least one input circuit contains a coil with iron core, in the air gap of which there is arranged at least one magnetic field-dependent semiconductor resistor which is disposed in a bridge circuit, to the output diagonal of which is the connected circuit output. Non-linear relations between the input and output signals can be avoided, according to a further feature of the invention, by providing an inverse feedback winding in the output circuit which is arranged on the core of the input coil.

In simultaneous conductive separation of the two input circuits a multiplication of two input voltages or currents to an output voltage or current, representing the product of both voltages, can be achieved by an arrangement in which a second input circuit is connected to the feed diagonal of the bridge circuit and the output signal representing the product of the input signals, is taken from the output diagonal of the bridge circuit. A circuit arrangement in which the two input circuits and the output circuit are conductively separated from one another and which likewise delivers the product of two input voltages is distinguished by the fact that in further development of the circuit arrangement just mentioned the output diagonal of the bridge circuit is connected with the field coil of another magnetic field-dependent semi-conductor resistor, which is disposed in a further bridge circuit. Magnetic build-dependent semi-conductor resistors are known per se, and semi-conductors of indium antimonide may be used to advantage for this purpose.

In further development of the inventive concept it is possible to also take into consideration the polarity of the input voltages and thereby achieve a polarity of the output voltage corresponding to the sign of the product of the input voltages. For this purpose there may be provided at least one signal input circuit which contains two field coils connected in parallel over oppositely poled rectifiers, which coils act in such a way on respective magnetic field-dependent semi-conductor resistors disposed in a bridge circuit, with corresponding premagnetization, that the bridge is unbalanced corresponding to the polarity of the fed-in signal and, upon supplying an additional signal on the feed diagonal, the output signal will have the polarity corresponding to the sign of the product of the input signals.

Depending on the type of material utilized for the iron core of the magnetic circuits which serve for the transfer of the magnetic field to the particular magnetic field-dependent resistor, the relation between the input magnitude and the output magnitude taken from the bridge circuit in which the magnetic field-dependent resistor lies is effected with a non-linearity, which, however, can be largely suppressed by inverse feedback. In a further development of the invention this can be achieved, for example, by an arrangement in which the second bridge circuit contains at least two magnetic field-dependent resistors, controlled by two field coils fed from the first bridge, and the magnetic circuit controlling the premagnetization of the cores is so dimensioned that the bridge is unbalanced in one or the other direction, corresponding to the polarity of the signal, whereby the signal in the output circuit takes on a polarity which corresponds to the sign of the product of the input signals. A further possibility of linearization comprises an arrangement in which inverse feedback coils are disposed in the output circuit of the second bridge circuit for effecting the linearization. A further circuit arrangement for linearization is distinguished by the feature that for the linearization, at least one magnetic field-dependent resistor is disposed in the control field of the coils of an input circuit, which resistor acts over a bridge circuit of the same input circuit and/or of another input circuit and/or the output circuit.

In the drawings, wherein like reference characters indicate like or corresponding parts:

FIG. 1 illustrates a switching arrangement in which at the terminals $e_1$ of the input circuit $E_1$, there is applied a direct current signal, which is conductively separated from the output circuit $A_K$, having output terminals *a*.

Figure 3:
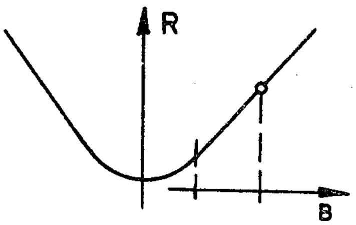
FIG. 3 is a graph illustrating the magnetic characteristic curve of the iron core and employed in the invention.

The terminals $e_1$ of the input circuit $E_1$ are connected with the field coil $L_1$ whose iron core $K_1$ contains an air gap in which a magnetic field-dependent semi-conductor resistor $F_1$ is disposed in a bridge circuit $W_1$ with three other ohmic resistors $R_1'$, $R_1''$, $R_1'''$. The feed diagonal A–B of the bridge $W_1$ is connected with terminals $e_2$ to which there is connected, in the embodiment represented, a D.C. source Q. The output diagonal C–D of the bridge circuit $W_1$ is connected with the output terminals $a$ of the output circuit $A_K$, at the terminals of which is obtained an amplified input signal. Through magnetization of the core $K_1$ by means of the coil $L_1'$, which is fed from the D.C. source $Q_1$, it can be achieved that the signal transmission utilizes so far as possible the linear range of the magnetic characteristic curve, which is represented in FIG. 3. For the further linearization there can be arranged in the core $K_1$ an inverse feedback winding $L_1''$, which is disposed in the output circuit $A_K$.

Figure 1:
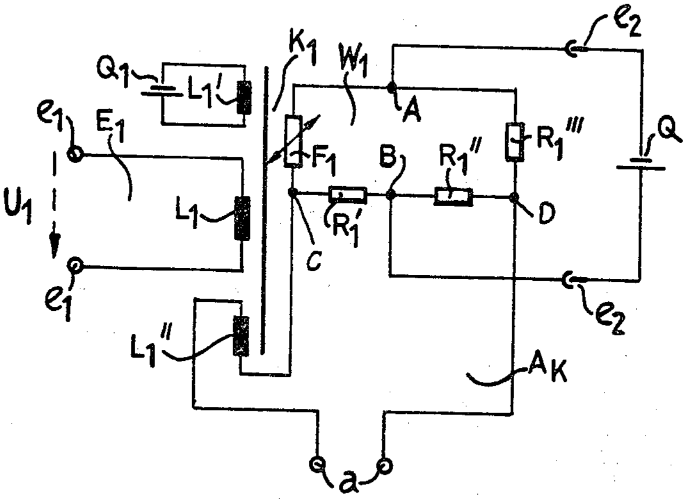
FIG. 1 is a diagram illustrating a circuit according to the invention.
Figure 2:
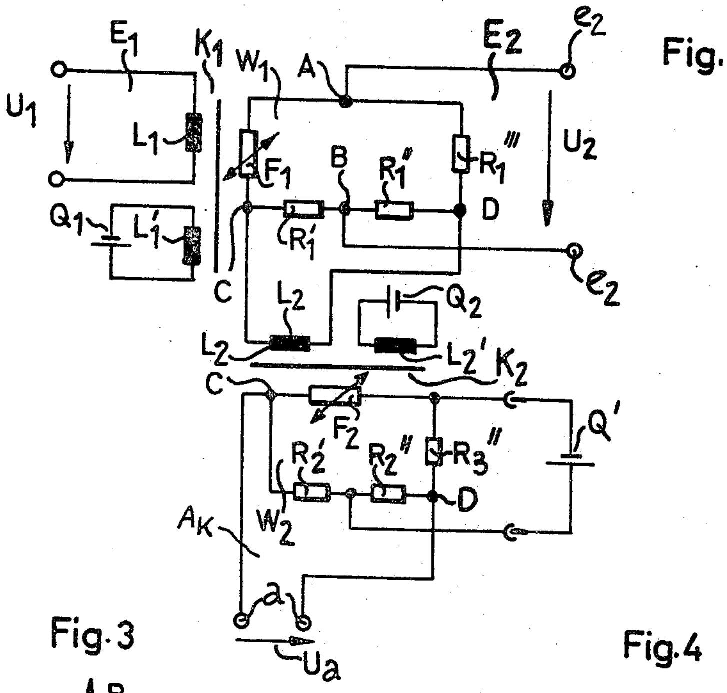
FIG. 2 is a diagram illustrating a circuit for the multiplication of two voltages.

The circuit illustrated in FIG. 2, for the multiplication of two input voltages $U_1$ and $U_2$, is similar to that illustrated in FIG. 1. The voltage $U_1$ is fed to the input terminals $e_1$ of the input circuit $E_1$ of the field coil $L_1$ whose iron core $K_1$ supplies the field for the magnetic field-dependent resistor $F_1$. The coil $L_1'$, which is fed from the D.C. source $Q_1$ serves for the premagnetization. The magnetic field-dependent resistor $F_1$, together with the resistors $R_1'$, $R_1''$, $R_1'''$, form a bridge circuit $W_1$, to the feed diagonal A–B of which is connected the voltage $U_2$, supplied over the terminals $e_2$ of the second input circuit $E_2$. The output diagonal C–D of bridge $W_1$ feeds a field coil $L_2$ whose core $K_2$ contains in its air gap a magnetic field-dependent resistor $F_2$, while the coil $L_2'$, with the D.C. source $Q_2$ serves for the premagnetization of the core $K_2$. The magnetic field-dependent resistor $F_2$ is disposed in an additional bridge circuit $W_2$ which includes resistors $R_2'$, $R_2''$, $R_2'''$, the bridge circuit being supplied with direct current from a D.C. source $Q'$ and at its output diagonal C–D delivers an output voltage $U_A$ to the terminals $a$, which is proportional to the product of the input voltages $U_1$ and $U_2$. Through the premagnetization by means of $L_1'$ and $Q_1$ in the arrangement according to FIG. 1, and $L_1'$ and $Q_1$ and $L_2$, and $Q_2$ in the arrangement according to FIG. 2, the product formation takes place in these arrangements with the correct sign.

Figures 5, 6:
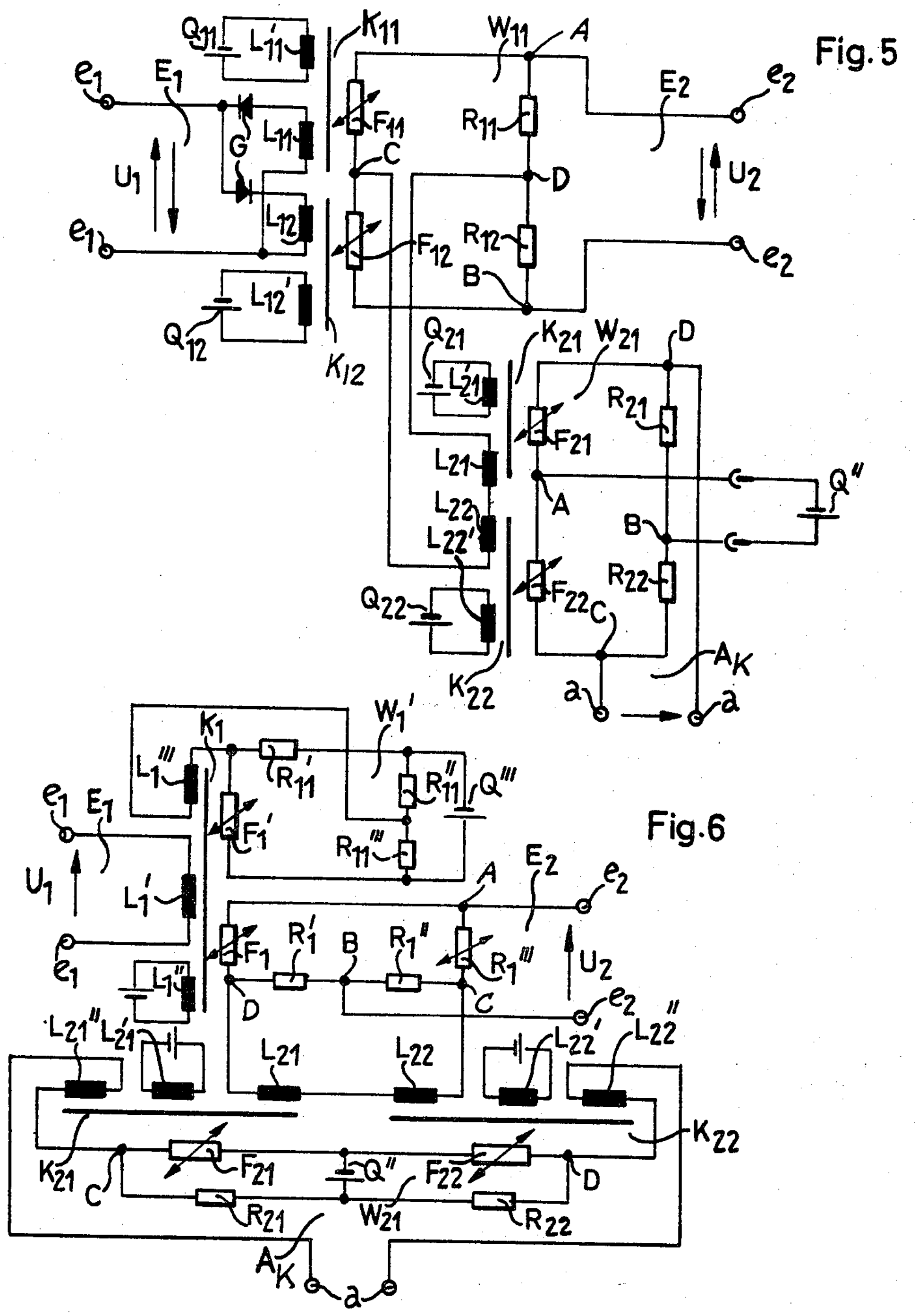
FIG. 5 is a diagram of a circuit similar to FIG. 2 with additional features.
FIGS. 6 and 7 are diagrams illustrating linearization circuits.

The circuit arrangement according to FIG. 5, in comparison to the circuit arrangement according to FIG. 2, in the multiplication of the two input voltages $U_1$ and $U_2$, permits a doubling of the linear operating range and a considerable reduction in the influence of the temperature coefficient of the field-dependent resistors on the product formation. For this purpose the voltage $U_1$ is fed over the terminals $e_1$ of the input circuit $E_1$ to two field coils $L_{11}$, $L_{12}$ circuited in parallel over oppositely poled rectifiers G. To the individual field coils $L_{11}$, $L_{12}$ there is allocated, in each case, a corresponding core $K_{11}$ and $K_{12}$, which additionally carry respective premagnetization windings $L_{11}'$ and $L_{12}'$, fed from corresponding current source $Q_{11}$ and $Q_{12}$. Disposed in the air gap of core $K_{11}$ is a magnetic field-dependent resistor $F_{11}$ and in the air gap of the core $K_{12}$ a magnetic field-dependent resistor $F_{12}$. The magnetic field-dependent resistors $F_{11}$ and $F_{12}$, together with the ohmic resistors $R_{11}$ and $R_{12}$ from a bridge circuit $W_{11}$, on whose feed diagonal A–B are disposed the input terminals $e_2$ of the second input circuit $E_2$, to which the signal $U_2$ is fed. From the output diagonal C–D of the bridge $W_{11}$ are fed two field coils $L_{21}$ and $L_{22}$ which act, in each case over respective cores $K_{21}$ and $K_{22}$ allocated thereto, on magnetic field-dependent resistors $F_{21}$ and $F_{22}$ of a bridge circuit $W_{21}$.

Figure 4:
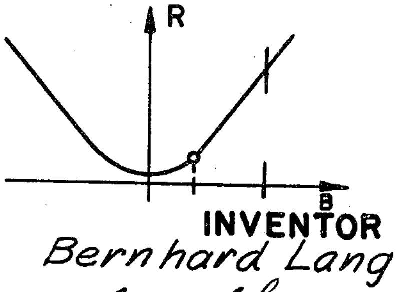
FIG. 4 is a similar one to FIG. 3.

The premagnetization coils are designated as $L_{21}'$ and $L_{22}'$, respectively, and the associated current sources are designated as $Q_{21}$ and $Q_{22}$. The premagnetization of the cores $K_{11}$, $K_{12}$ is so selected in this case, as represented in FIG. 4, that the working point lies in each case at one end of the linear range, while the premagnetization of $K_{21}$ and $K_{22}$ is so selected that the working point is in accordance with FIG. 3. For example, with positive input voltage $U_1$ only the coil $L_{11}$ is excited, which, in the case of an input voltage $U_2$, leads to the result that, for example, the resistance of resistor $F_{21}$ increases, while that of $F_{22}$ decreases, whereby the bridge $W_{21}$ is correspondingly unbalanced. To the bridge circuit $W_{21}$, which additionally contains the ohmic resistors $R_{21}$ and $R_{22}$, there is fed on the feed diagonal A–B a constant D.C. voltage from the source $Q''$. The output diagonal C–D of the bridge circuit $W_{21}$ forms the output circuit $A_K$ having terminals $a$, at which the output voltage $U_A$ is obtained, the polarity of which corresponds to the correct sign product of the input voltages $U_1$ and $U_2$, with a doubling of the linear range of the field-dependent resistors $F_{11}$ and $F_{12}$ and a reduction of the influence of the temperature coefficient of the field-dependent resistors $F_{11}$, $F_{12}$ and $F_{21}$ and $F_{22}$ by more than one order of magnitude.

Figure 7:
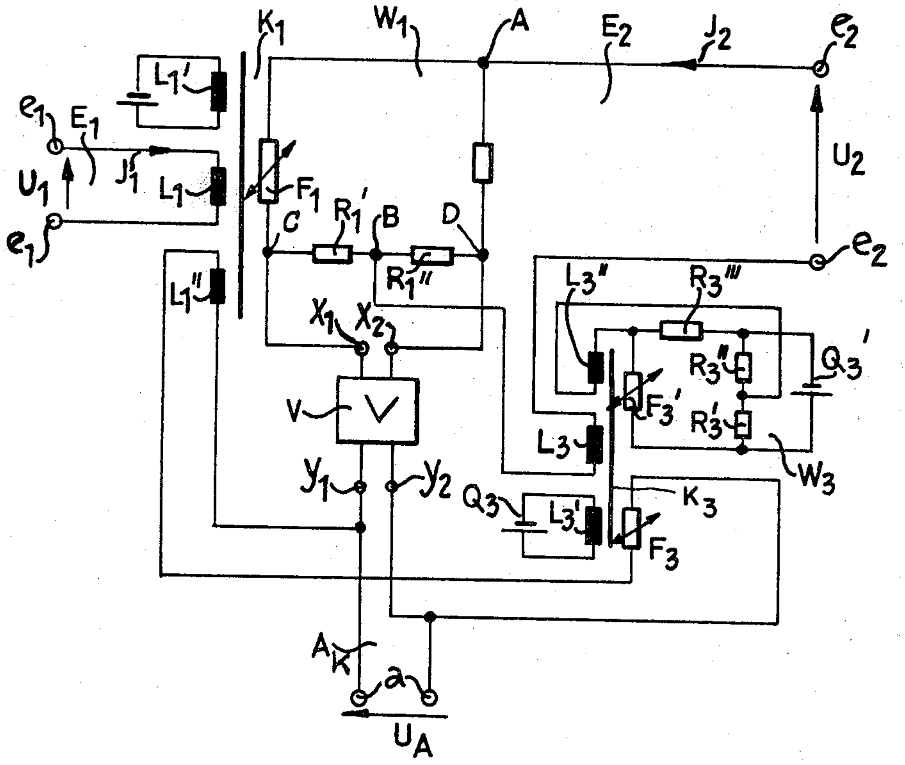

A few possibilities of linearization are hereafter explained with the aid of FIGS. 6 and 7. In the circuit arrangement according to FIG. 6, which corresponds in principle to the circuit arrangement of FIG. 5 (the input circuit $E_1$ being drawn in simplified form) the core $K_1$, which carries the field coil $L_1'$ of the input circuit $E_1$, contains in its air gap two magnetic field-dependent resistors $F_1$ and $F_1'$. The resistor $F_1'$, with the ohmic resistors $R_{11}'$, $R_{11}''$, $R_{11}'''$, is connected in a bridge circuit fed from the source $Q'''$, and whose output current feeds the coil $L_1'''$, which also is arranged on the core K. The bridge circuits $W_1'''$ is so dimensioned and the coil $L_1'''$ is so poled, that a linearization of the transmission characteristic curve takes place.

The bridge circuit $W_1$ which contains, in addition to the magnetic field-dependent resistor $F_1$, the ohmic resistors $R_1'$, $R_1''$ and $R_1'''$, and on whose feed diagonal A–B there is applied the input voltage $U_2$, and in the output diagonal C–D in series the field coils $L_{21}$ and $L_{22}$, to which are allocated cores $K_{21}$ and $K_{22}$. In addition to the premagnetization windings $L_{21}'$ and $L_{22}'$, the cores $K_{21}$ and $K_{22}$ respectively carry an inverse feedback windings $L_{21}''$ and $L_{22}''$. The inverse feedback windings $L_{21}''$ and $L_{22}''$ are disposed in the output circuit $A_K$, which is fed from the output diagonal C–D of the bridge circuit $W_{21}$. The bridge circuit $W_{21}$ corresponds to the bridge circuit of the same designation in FIG. 5.

Figure 8:
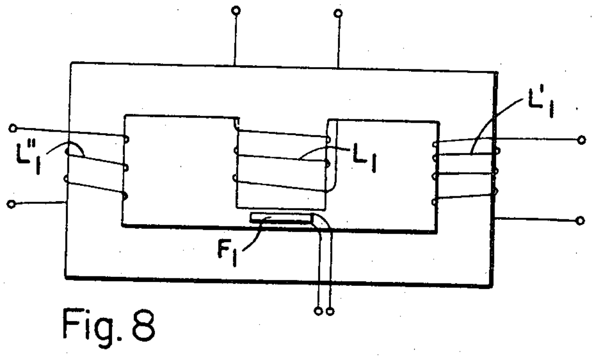
FIG. 8 illustrates a core with an air gap with a field dependent resistor mounted in the gap.

The circuit arrangement illustrated in FIG. 7 corresponds, with respect to its input circuit $E_1$, to the arrangement according to FIG. 2, but the linearization here takes place in such a manner that a coupling is provided both of the input circuit $E_1$ and also of the input circuit $E_2$ with the output circuit $A_K$, with the latter being fed from an amplifier V, not described in detail, which possibly can likewise contain, in the manner heretofore described, means for the conductive separation of its input and output terminal $x_1$–$x_2$, $y_1$–$y_2$. Between the input terminals $e_2$ of the second input voltage $U_2$ and of the feed diagonal A–B of the bridge circuit $W_1$ there is additionally disposed a field coil $L_3$, whose core $K_3$ contains in its air gap two magnetic field-dependent resistors $F_3$, $F_3'$. The magnetic field-dependent resistor $F_3'$ lies in a bridge circuit $W_3$, from which the inverse feedback winding $L_3''$ is fed. The winding $L_3'$, fed from the D.C. source $Q_3$, provides the premagnetization for the selection of the desired working point. Parallel to the output terminals $a$ there is connected the series circuit comprising the feedback winding $L_1''$ and the magnetic field-dependent resistor $F_3$, whose resistance changes under the influence of the linearized second input voltage $U_2$, the resulting operating charge being fed back over the output voltage $U_A$ to the winding $L_1''$ on the core $K_1$. FIGURE 8 illustrates an iron core with windings $L_1$, $L_1'$ and $L_1''$ mounted on various legs and formed with an air gap in which resistor $F_1$ is mounted.

The manner of operation of the arrangement can also be considered as a division, as the field-dependent resistor $F_3$ effects a division of the product of the currents $J_1$ and $J_2$, as well as of a constant, through the current $J_2$, the latter acting on the resistor $F_3$ by means of the field of coil $L_3$.

Changes may be made within the scope and spirit of the appended claims which define what is believed to be new and desired to have protected by Letters Patent.

I claim:

1. Apparatus for multiplying a pair of input electrical signals and obtaining an output which is electrically isolated from both of the input electrical signals comprising, a first magnetic core formed with an air gap, a first energizing winding mounted on said core and connected to the first input signal, a bridge circuit receiving the second input signal, a field-dependent resistor mounted in the air gap of the core and forming one leg of the bridge, a second magnetic core formed with an air gap, a second energizing winding mounted on the second core and connected to the output of said bridge circuit, a second bridge circuit, a second field-dependent resistor mounted in the air gap of the second core and forming one leg of the second bridge circuit, and output signal terminals connected to the second bridge to remove a signal which is isolated from both input signals.

2. In apparatus according to claim 1, first and second biasing windings mounted respectively on the first and second magnetic cores.

3. In apparatus according to claim 1, a third energizing winding mounted on the first core and connected to the first input signal to pass current in one direction, the first energizing winding connected to the first input signal to pass current in the other direction, a third field-dependent resistor mounted in the first bridge circuit and in the air gap of the first core, a third magnetic core formed with an air gap, a fourth energizing winding mounted on the third magnetic core and connected in circuit with the second energizing winding, and a fourth field-dependent resistor mounted in the second bridge circuit and in the air gap of the third magnetic core.

4. Apparatus according to claim 3 for assuring linearity of the output of the circuit comprising a third bridge circuit, a fifth field-dependent resistor mounted in the air gap of the first core and in circuit with the third bridge circuit, and biasing means connected to the third bridge.

5. Apparatus according to claim 3, a first feedback winding mounted on the second core and connected in circuit with the second bridge circuit.

6. Apparatus according to claim 5, a second feedback winding mounted on the third core and connected in circuit with the second bridge circuit.

References Cited

UNITED STATES PATENTS

| | | | |
|---|---|---|---|
| 2,941,163 | 6/1960 | Hess | 332—51 |
| 2,946,955 | 7/1960 | Kuhrt | 324—101 |
| 3,024,997 | 3/1962 | Sun | 235—194 |
| 3,121,788 | 2/1964 | Hilbinger | 235—194 |
| 3,202,809 | 8/1965 | King et al. | 235—196 |

MILTON O. HIRSHFIELD, *Primary Examiner.*

WARREN E. RAY, *Assistant Examiner.*